INVENTORS
THOMAS J. WATSON
SAMUEL BRAND
BY J. W. Lounitzer
ATTORNEY

Patented May 5, 1953

2,637,398

UNITED STATES PATENT OFFICE 2,637,398

RECORD PUNCHING MACHINE AND RECORDING MACHINE CONTROL BY SAID PUNCHED RECORD

Thomas J. Watson, New Canaan, Conn., and Samuel Brand, Binghamton, N. Y., assignors to International Business Machines Corporation, New York, N. Y., a corporation of New York Application June 4, 1947, Serial No. 752,390

2 Claims. (Cl. 164—112)

This invention relates to an apparatus for punching hand-written paper checks of various sizes in a manner which lessens their defacement so that they will be acceptable for transactions by business and banks after punching and to an apparatus which will, regardless of their different sizes, insure their proper position for sensing to effect adding-listing operations directly under control of their perforations.

It is well known that a large number of printed checks are issued in the form of perforated cards of standard sizes and accounting operations are performed directly under control of such cards in commercially available record controlled accounting machines.

At present, a large number of checks are of the paper type made out by handwriting, and such checks are received by banks for deposit, collection, etc. Each paper check has to be individually handled, the amounts verified, signatures checked, etc. so that the banks will not sustain a loss.

The present practice is to use a conventional key controlled adding-listing machine to list all paper checks received for deposit or collection which have been previously sorted out according to the name of the bank, depositor or account number and to have the printed list of amounts of checks and accompanying total placed with each related group of checks and given to the bookkeeper to credit the account with the total amount, or returned to the bank on which they are drawn. This is presently known as "package posting" when checks are listed for crediting accounts with a total.

The present invention relates to the apparatus whereby such accounting operations can be performed directly under control of paper checks without requiring the operator to depress the keys of the adding-listing machine and to be able to utilize such paper checks for such control irrespective of their various sizes.

A prerequisite to the control of an adding-listing machine by sensing punched, hand-written checks is that the paper checks should be punched to represent the amounts indicated and the present invention includes, as a preliminary step of the method, the punching on a field of the checks of various sizes the amounts in such a place that the small holes will not more than partially obliterate the handwriting on the check, such as signature, amount, endorsement, etc. This is carried out by allowing considerable latitude in the location for punching on the various sizes of paper checks, but which will insure the proper coordination of the punched holes with a sensing means. This coordination is essential and by the presently disclosed method of punching of various sizes of checks in suitable places securing this coordination enables paper checks to be sensed in the same efficient way as card checks are sensed.

In carrying out this initial step of check punching, the punching can be effected by hand, which is by the preferred form of the apparatus shown and consists of the step of punching amount representing holes in columns wherein the holes are differentially located from a fixed edge of the check, herein the lower horizontal edge, to represent each digit. In the form of apparatus shown the manual insertion of the check to this properly located position is determined by a stop bar coacting with the lower horizontal edge of the check.

With the instant device for punching checks the desired coordination of the holes with the sensing means is determined by the punching of auxiliary locating holes or the making of printed marks, which are at a fixed position with respect to the adjacent column of holes. These locating or pilot holes or printed marks determine the proper position of the check when inserted in the sensing means and irrespective of the location of the punched area on the check, which varies due to the different sizes of the checks and the writing thereon, the proper coordination will be insured.

In the apparatus wherein the checks are sensed, these locating holes are aligned with detecting means preferably electronic in form which is operative to cause the automatic sensing of the punched holes to set up amounts to be entered and printed by the adding machine when the locating holes are correlated with the detecting means.

It is therefore an object of the present invention to provide a check sensing means for punched checks with an electronic form of detecting means and associated controls which effect the automatic operation of the adding-listing machine when the proper sensing position of the check is detected.

Other objects of the invention will be pointed out in the following description and claims and illustrated in the accompanying drawings, which disclose, by way of example, the principle of the invention and the best mode, which has been contemplated, of applying that principle.

Figure 1:
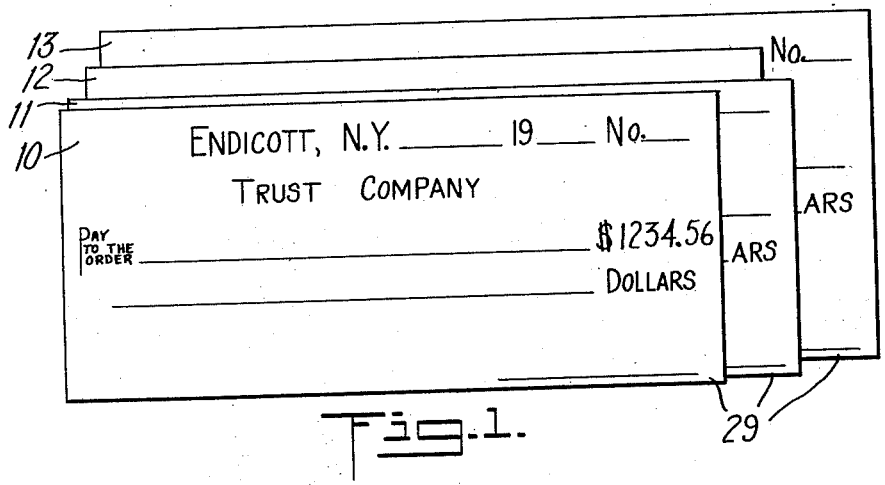
Fig. 1 shows a series of checks of different sizes.

Fig. 1 represents a series of checks 10, 11, 12 and 13 which are, to illustrate one use, received by the bank for deposit by a customer and which are of different sizes because of the absence of any present day standards which require banks to have their checks conform to certain sizes. Thus, for example, the checks may be of different lengths, different widths, or only vary in one dimension if the other dimension is constant.

However, each check has a signature and an endorsement which are usually at fixed positions on the check, which leaves a portion of the check area free for receiving small punched holes, and considerable latitude is provided for selecting such an area. It is, of course, undesirable to have such punched holes made in an area which would obliterate any portion of the check having the signature, endorsement, designated amounts, etc. which are customarily examined for verification. With the present punching mechanism the punched check area in the horizontal dimension of the check can be selected by the operator by inserting it in the check punching mechanism in Figs. 2 and 3 carrying out a step of the method according to the invention.

The punching mechanism for carrying out this step can be of various forms, and perferably comprises a key controlled punching mechanism in which the keys are first depressed to select the punches for operation which will punch the amount on the check corresponding to the written amount, and then a power or manual actuation of the selected punches makes the desired amount representing holes in the check.

For purposes of illustration it will be assumed that the amount of the check does not exceed six denominations or up to 9999.99 and accordingly six banks of keys 14 are provided, each bank of keys to cause punching of 0–9 representing holes in a column of the check.

Each key 14 has a depending stem 15 slidably mounted in guide plates 16 and 17, and is depressed against the action of a spring 18. A lug 19 of each key is latched beneath a detent plate 20 for each bank in the usual manner when a key is depressed, and the key depression brings a lower punch stem 21 directly over the index point in the check to be punched, but does not actually effect the punching at this time. Punching is effected after all keys have been depressed when a punch die 22 is reciprocated. The reciprocation of the punch die is performed by a cam 23 rotated by a drive shaft 24 through the usual one-revolution clutch 25. The clutch is engaged by energization of a magnet 26, which can be energized to effect operation of the punch die by contacts closed by a special key 26a which is operated after all the amount keys are depressed.

In the usual manner the detent plate 20 for each bank is reciprocated after the punching operation to release the latched-down keys 14, which are now returned by their springs 18.

Figures 2, 3:
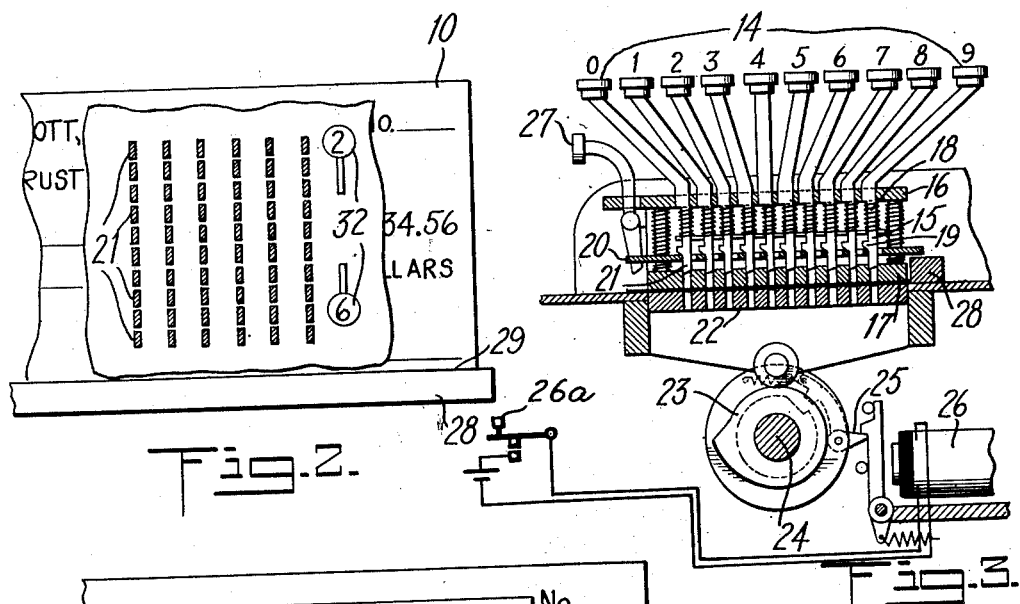
Fig. 2 is a diagrammatic view showing the relationship of punches and a check to be punched.
Fig. 3 is a vertical sectional view of the check punching machine.

If an error in depressing a key is discerned it can be corrected by operation of an error key 27 for each bank which has an obvious mechanical connection to reciprocate the detent plate 20 for that bank which allows the release of the erroneously depressed key, as is evident in Fig. 3.

Prior to depression of the keys, or even after the keys have been depressed, the check is manually inserted in the punch by the operator between the guide plate 17 and die plate 22. The checks are inserted in the machine either from the left or right of the operator, or from the back, but in either direction of insertion the lower horizontal edge of the check is disposed against a fixed bar, or stop plate 28, as shown in Fig. 2. Thus, the location of the perforations with respect to the lower horizontal edge 29 of the check is fixed. However, the disposition of the punched field with respect to the left and right hand edges of the check is variable and selectable by the operator. The extent of shift to locate the punched field will be selected to cause perforations at places which will not obliterate any of the marking or writing on the check, on either face so that they are not readable.

Figure 4:
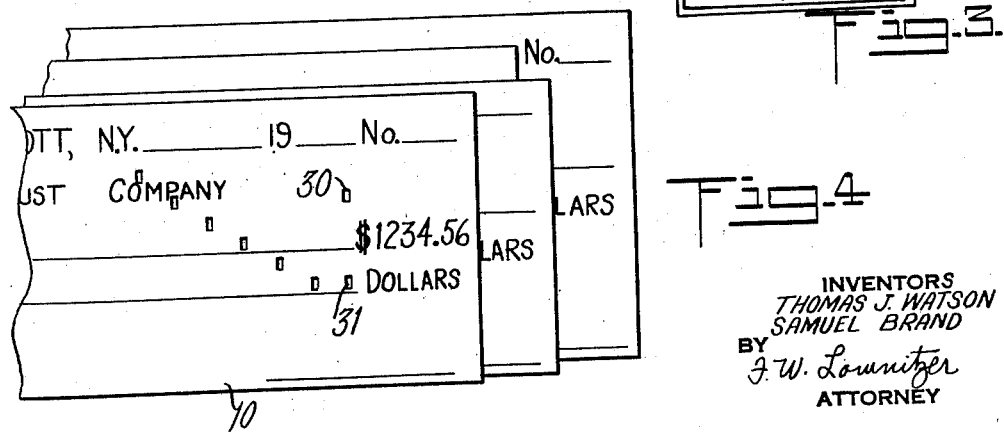
Fig. 4 shows a series of punched checks.

In the foremost check in Fig. 1, the written amount $1,234.56 is seen and in Fig. 4 this same check is shown perforated to represent the same amount, and it will be seen that the punched area has been selected so as not to delete, or more than partially obliterate any written matter on the check so that it is not readable.

The coding, size, and spacing of the perforations are variable so that these characteristics can be selected to conform to the requirements in utilizing punched written checks for check accounting.

For control of accounting the punched paper checks are sensed and the required coordination of the check sensing means and the inserted checks requires that the sensing be done only when such coordination is secured. To secure this each check is punched with two aligning holes 30, 31 which are in the same column and are at a fixed distance to the right of the amount punched field. Two related punch keys 32 cause the perforation of these two aligning or locating holes, utilized for a purpose to be later described. However, in carrying out this step of the method a single aligning or locating hole may be used for the same control purposes and printed marks may be made instead of punching holes. If so desired the punches for the aligning holes may be fixed in punching position to punch each time without requiring a key depression.

After a series of checks are punched they are sorted out by hand into groups according to each depositor's name, or account number. Each group of checks is now ready to be used as a control of an accounting machine to obtain a printed list and/or an accumulated total of all checks deposited for credit to the same account.

Figure 5:
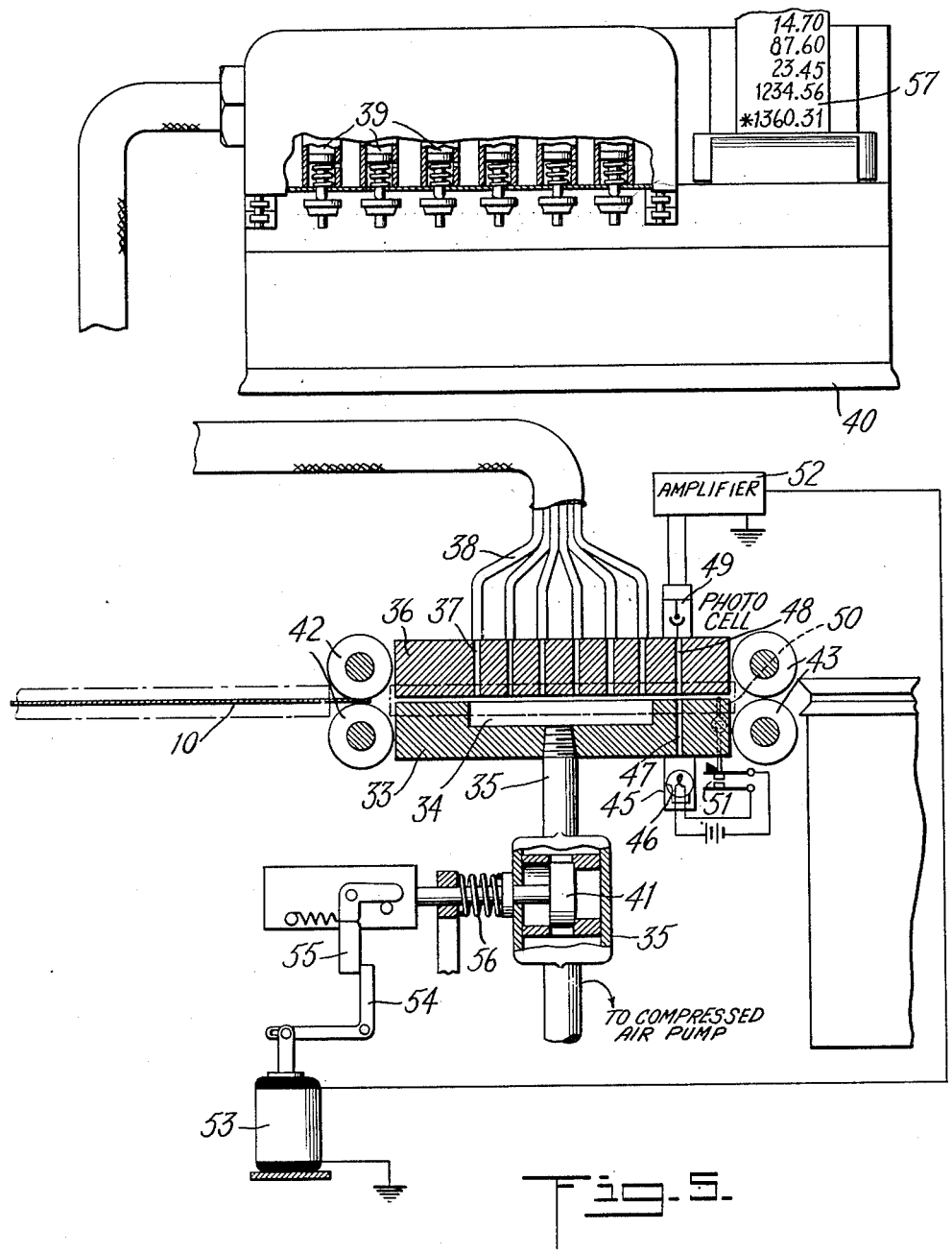
Fig. 5 shows a check sensing means and the coordinated control for an adding-listing machine.

The amount representing holes can be sensed electrically, pneumatically, or in any desirable way, and for illustrative purposes pneumatic sensing is shown in Fig. 5.

The pneumatic check perforation sensing means comprises an air block 33 having a channel 34 to which an air intake pipe 35 has an entrance. The cooperating block 36 has six series of air passageways 37, one to sense each possible hole in a related column to be sensed. Individual air tubes 38 lead from each of the passageways 37 to operating valves 39, each of which is positioned over the keys of a conventional adding-listing machine 40. The pistons of such valves 39 operate said keys whenever they are moved by the admission of air through intake pipe 35 to the sensing head blocks 33—36, controlled by the perforations in the check. A check, such as 10, is inserted between the blocks 33 and 36, and at a predetermined lateral position of the check, determined by the aligning holes 30 or 31, air is admitted to the intake tube 35 by the opening of a valve 41, to thus automatically operate the keys of the adding-listing machine. It is, of course, evident that the sensing head has a fixed guide bar (shown in dash-dot lines in Fig. 5) like the bar 28 of the punching machine against which the lower horizontal edge of each check is projected to thus coordinate the punched holes with the sensing head.

The check may be inserted to the right to the desired position, either manually or by sets of feeding rollers 42, 43, as in the case of a motor operated check feed.

Carried by the block 33 is a tube 45 which carries a light source or bulb 46 which projects light through a slot 47 and through holes 48 in block 36 excites photocells 49 when the related aligning holes 30, 31, or printed marks, if they are made instead, are sensed. If a single aligning hole or printed mark is used, only one hole 48 and photocell 49 is necessary. The slot 47 and holes 48 are at the same relative position with respect to the right hand series of holes 37 as the right hand perforation in the check (units column) is with respect to the column in which the aligning holes 30, 31 are made in the check.

Normally the bulb 46 is not illuminated but when the check is shifted to the right the leading edge will rock a card lever 50 to close contacts 51 and thus close the circuit to the bulb 46 and while a ray of light projects through the slot 47 the excitation of the photocell, or photocells through the holes 48 takes place only upon registration of the aligning holes 30, 31 with the holes 48. Two photocells 49 are preferred because if one does not operate, the other in all probability will continue to function.

The excitation current of the photocells is amplified by an amplifier 52 and the output current of this amplifier is transmitted to a solenoid 53 which actuates the valve 41 in the entrance pipe 35 momentarily, just long enough to cause the air pressure in the air tubes to actuate the plungers 39 and depress the keys of the adding-listing machine.

The plunger of the solenoid 53 rocks a bell crank 54, the vertical arm of which engages a by-pass pawl 55 carried by the stem of the piston of valve 41. The piston is moved sufficiently to open the entrance pipe 35 to the air pressure, and when the vertical arm of the bell crank 54 has passed by the by-pass pawl 55 a spring 56 will return the piston and the valve will be closed after its momentary opening.

The cyclic operation of the machine may be automatically initiated by the excitation of the photocells, to thus cause the engagement of the motor driven clutch of the adding machine delayed in time to take place after the keys are depressed. This would be an obvious arrangement and therefore is not shown in the drawings. If so desired, the air in tubes 38 of the units column may operate a valve 39 positioned over the motor bar of the adding machine to carry out an automatic initiation of the adding machine.

After the check has been sensed and the amount entered in the adding-listing machine it is withdrawn by the operator and a following check is inserted and the operation is repeated. Reference numeral 57 represents the printed tape of the adding-listing machine which lists the amounts of all the checks of the same depositor, and the accompanying total. The tape is detached from the machine and the group of checks and accompanying tape is transmitted to the bookkeeping department of a bank for "package posting."

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described, wherein paper checks having written data thereon and of equal or various lengths are punched in selected areas which will effect the minimum or no defacement of said written data and to subsequently control a recording machine, the combination of a multidenominational keyboard, punches including an alignment control hole punch, means for causing said alignment control hole punch to punch an alignment control hole, and for causing said punches under control of said keyboard to punch multidenominational amount representing holes on said check to represent the multidenominational amount written thereon, said amount representing punched holes and alignment control hole being located at said selected areas on the check which are variably located with respect to the vertical edges of the checks to lessen defacement of informative written matter on the check, a plurality of denominationally ordered selector control means for a recording machine, means for pneumatically sensing the amount representing punched holes, a photoelectric cell rendered responsive to a projected light ray passing through said alignment control hole when the alignment control hole is correlated with said photelectric cell, and means rendered operative by said photoelectric cell when said latter is rendered responsive for causing said pneumatic sensing means to be operative to sense the amount representing holes to control said denominationally ordered selector control means.

2. In a machine of the class described, wherein paper checks having written data thereon and of equal or various lengths are punched in selected areas which will effect the minimum or no defacement of said written data and to subsequently control a recording machine, the combination of a multidenominational keyboard, punches including an alignment control hole punch, means for causing said alignment control hole punch to punch an alignment control hole, and for causing said punches under control of said keyboard to punch multidenominational amount representing holes on said check to represent the multidenominational amount written thereon, said amount representing punched holes and alignment control hole being located at said selected areas on the check which are variably located with respect to the vertical edges of the checks to lessen defacement of informative written matter on the check, a plurality of denominationally ordered selector control means for said recording machine, means for sensing the amount representing holes, means comprising light ray issuing means and a photoelectric cell rendered responsive to a projected light ray passing through the control hole for detecting when said control hole is correlated with the photoelectric cell, means actuated by the check to render the detecting means operative prior to detecting the control hole, and means rendered operative by said detecting means when the alignment control hole enables said light ray to render the photoelectric cell responsive for causing said sensing means to sense the amount representing holes to control said denominationally ordered selector control means.

THOMAS J. WATSON.
SAMUEL BRAND.

References Cited in the file of this patent

UNITED STATES PATENTS

| Number | Name | Date |
|---|---|---|
| 748,766 | Marshall | Jan. 5, 1904 |
| 1,350,850 | Trew | Aug. 24, 1920 |
| 1,701,436 | Baker | Feb. 5, 1929 |
| 1,753,991 | Langford | Apr. 8, 1930 |
| 2,011,588 | Morris | Aug. 20, 1935 |
| 2,085,120 | Potts | June 29, 1937 |
| 2,132,413 | Gollwitzer | Oct. 11, 1938 |
| 2,438,588 | Tolson | Mar. 30, 1948 |

FOREIGN PATENTS

| Number | Country | Date |
|---|---|---|
| 580,675 | Germany | July 19, 1933 |